United States Patent [19]
Nakamura

[11] 3,800,426
[45] Apr. 2, 1974

[54] INCLINATION MEASURING APPARATUS

[76] Inventor: Masazo Nakamura, No. 50, Daihojichohigashirocho, Minami-ku, Osaka-fu, Japan

[22] Filed: July 2, 1971

[21] Appl. No.: 159,337

[30] Foreign Application Priority Data
Sept. 22, 1970  Japan.............................. 45-94775

[52] U.S. Cl................................... 33/368, 33/399
[51] Int. Cl............................................. G01c 9/12
[58] Field of Search .............. 33/368, 391, 348, 399

[56] References Cited
UNITED STATES PATENTS
| | | | |
|---|---|---|---|
| 1,261,658 | 4/1918 | Waller | 33/391 |
| 811,777 | 2/1906 | Konig | 33/215 A |
| 2,775,736 | 12/1956 | Pies | 33/348 |
| 1,227,360 | 5/1917 | Young | 33/368 |
| 569,500 | 10/1896 | Juney | 33/368 |

*Primary Examiner*—John W. Huckert
*Assistant Examiner*—Jon W. Henry
*Attorney, Agent, or Firm*—Wenderoth, Lind & Ponack

[57] ABSTRACT

An inclination measuring apparatus includes a casing with a flat underside to be brought into contact with a surface to be measured. A base member is rotatably positioned within the casing and has a spindle penetrating the center thereof. On the upper and lower ends of the base member are respectively provided an indicator and a weight. A graduation plate is provided on one end of the spindle, and a window is provided on the casing so that the point on the graduation plate at which the indicator stops may be read.

1 Claim, 4 Drawing Figures

PATENTED APR 2 1974 3,800,426
SHEET 2 OF 2
FIG,3
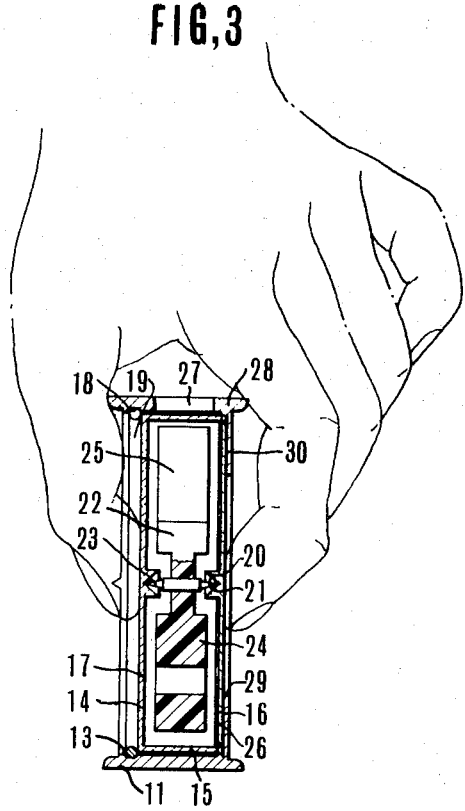
FIG,4
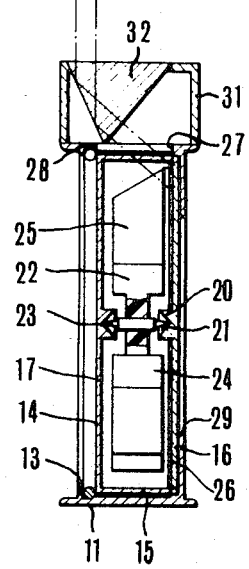
MASAZO NAKAMURA,
INVENTOR.
BY Wenderoth, Lind & Ponack
ATTORNEYS 3,800,426

INCLINATION MEASURING APPARATUS

BACKGROUND OF THE INVENTION

This invention relates to an inclination measuring apparatus, and more particularly to an inclination measuring apparatus by the use of which it is possible to measure, by applying said apparatus to any portion of a required body, at what angle said portion is inclined in relation to the vertical or the horizontal.

In the case of conventional inclination measuring, a known level having a bubble contained in a transparent pipe is used, but measuring becomes impossible in some part of the surface to be measured because of the disappearance of the bubble when the inclination of the level is too great. Consequently, the horizontal line is first obtained by the level and then the inclination of the inclined surface in relation to said horizontal line is measured by means of a protractor or the like. However, this measuring method involves various inconveniences, for example, inaccuracy in the measured values.

OBJECTS AND BRIEF DESCRIPTION OF THE INVENTION

A first object of this invention is to provide a device which make it possible to measure instantaneously any angle of inclination (gradient) in any state of inclination.

A second object of this invention is to provide a device which makes it possible to ascertain the measured values from above the device.

A third object of this invention is to provide a device which makes it possible to prevent the indicator at the time of measuring from rotating back to its original position.

These and other objects are accomplished by the parts, improvements, combinations and arrangements comprising the invention, a preferred embodiment of which is shown by way of example in the accompanying drawings, and herein described in detail. Various modifications and changes in details of construction are comprehended within the scope of the appended claims.

BRIEF DESCRIPTION OF THE DRAWINGS

FIG. 3 is a lateral view of a longitudinal section of the inclination measuring apparatus of this invention.

FIG. 4 is a lateral view of a longitudinal section of said apparatus, wherein a reflector member is mounted thereon.

DETAILED DESCRIPTION OF THE INVENTION

Figure 1:
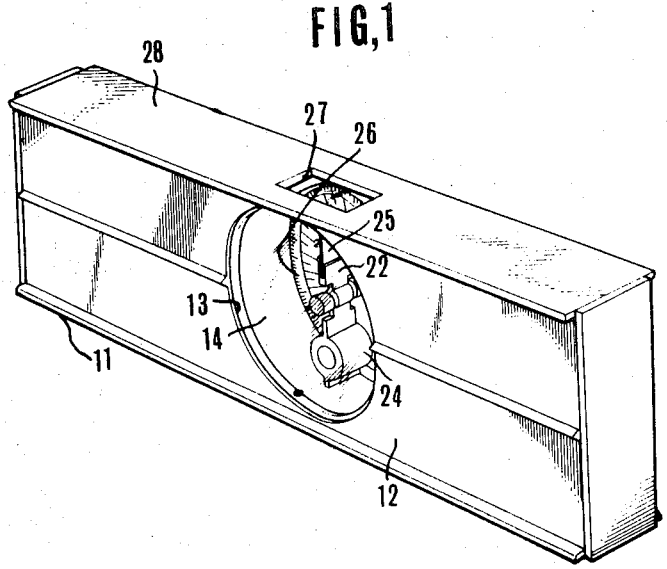
FIG. 1 is a perspective of the inclination measuring apparatus of this invention.
Figure 2:
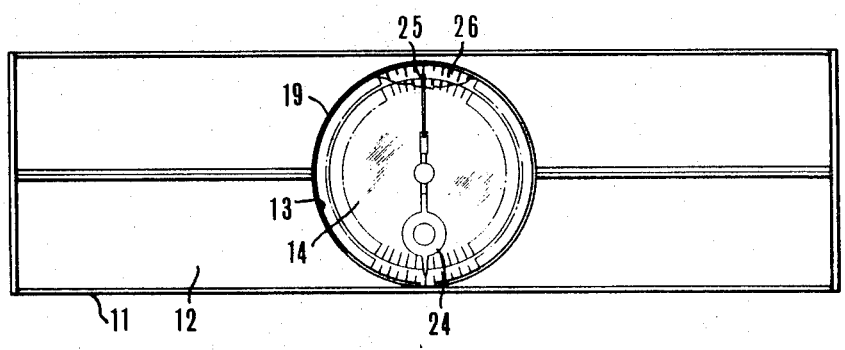
FIG. 2 is an elevation of said apparatus, of which a part is broken away.

In FIGS. 1, 2, 3 and 4, the numeral 11 designates an outer casing having a flat underside to be brought into contact with the surface to be measured, a circular penetration port 13 being provided in the center of the front face wall 12 of said casing 11. The apparatus also comprises an inner casing 17 consisting of a transparent cylindrical wall 15 integrally formed with the peripheral edge of a transparent disk-shaped front wall 14 fitted into said penetration port 13 and housed inside said casing 11, and rear wall 16 composed of a pressure-deformable elastic plate which is detachable by means of fitting through the marginal aperture of the cylindrical wall 15 or the like method. The rear wall 16 is formed such that the central inner surface thereof slightly approaches the front wall 14 when pressure is applied to the central part of the outer surface thereof. After the inner casing 17 has been fitted into the outer casing 11 through the penetration port 13, the inner casing 17 is prevented from displacement by fitting a ring 19 consisting of severed levers into an annular groove 18 having an L-shaped section along the open edge of the penetration port 13 on the reverse side of the front face wall 12 as shown in FIGS. 3 and 4. The numeral 20 designates mutually protruding projections in the center of the confronting surfaces of the front wall 14 and the rear wall 16 respectively, a conical recessed hole 21 being formed at the outermost end face of each of said projections 20, 20. The numeral 22 designates a base member, a spindle 23 being rotatably fitted into the recessed hole 21 through the center of the base member 22. A weight member 24 is provided at the lower end of the base member 22, and an indicator 25 consisting of a thin plate is provided at the upper end of said base member 22. The numeral 26 designates a graduation plate with notches up to 360 degrees fixed to the inner surface of the rear wall 16. The numeral 27 designates a window through which it is possible to read the graduations provided in the center between both ends of the top wall 28 of the casing 11. The numeral 29 designates a penetration hole provided in the center of the rear face wall 30 of the casing 11 so as to enable a finger to apply pressure therethrough to the rear wall 16.

Furthermore, as shown in FIG. 4, a wall member 31 integral with the top wall 28 may be erected so as to enclose the window 27 on the upper surface of said top wall 28. In the upper end of wall member 31 is built a prism element whereby it is possible to read the indicated values on the graduation plate 26 and also a reflector element 32 consisting of a reflex mirror.

The inclination measuring apparatus of this invention as described hereinbefore is placed on the required surface to be measured with the underside of the casing 11 brought into contact therewith, whenever necessary in civil engineering and construction work or installation of machines. If the surface is inclined, the weight member 24 rotates with the spindle 23 in the recessed holes 21 into which said spindle 23 is fitted as fulcrums until it comes to a halt on the perpendicular line, thereby making it possible to read the value of the inclination angle on the graduation plate 26 by the graduation corresponding to the position at which the indicator 25 secured to the upper end of the base member 22 stops, from any position either through the penetration port 13, the window 27, or the reflector member 32.

Moreover, while measuring the inclination, if a thumb is applied to the front wall 14 of the inner casing 17 and the rear wall 16 is pressed inwardly by a finger put through the penetration hole in the rear face wall 30, the distance between the recessed holes 21 of the projections 20 into which the spindle 23 is fitted is reduced, with the result that the spindle 23 is prevented from rotating, thereby making it possible to read the inclination angle (gradient) when the casing 11 is removed from the surface to be measured.

What is claimed is:

1. An inclination measuring apparatus comprising:

rectangular outer casing having a flat bottom for contact with a plane to be measured, a circular penetration hole being provided in the center of a front wall of said outer casing, a penetration hole through which a finger is insertable being provided in the center of a rear wall of said outer casing, a window being provided in the center of the top wall of said outer casing;

an inner casing detachably fitted into said penetration hole on said front wall of said outer casing, said inner casing comprising a disk shaped front wall, a peripheral wall extending rearwardly from the periphery of said front wall, and a disk-shaped rear wall fitted to said peripheral wall, said disk-shaped rear wall of said inner casing consisting of a resilient plate deformable under pressure applied thereto;

a scale plate graduated in 360° positioned on the interior of said disk-shaped rear wall of said inner casing;

a projection extending inwardly from the center of each of said front wall and rear wall of said inner casing, a conical recessed hole formed in the end face of each of said projections;

a rotatable indicator spindle fitted at each end thereof into said recessed holes, said spindle having thereon an indicator extending to a position adjacent said scale plate; and a wall member positioned on said top wall of said outer casing to enclose said window, a reflector member comprising a prism being positioned in said wall member.

* * * * *